US011645408B2

(12) United States Patent
McEnroe et al.

(10) Patent No.: US 11,645,408 B2
(45) Date of Patent: *May 9, 2023

(54) CONTROLLING ACCESS TO DATASETS DESCRIBED IN A CRYPTOGRAPHICALLY SIGNED RECORD

(71) Applicant: AT&T Intellectual Property I, L.P., Atlanta, GA (US)

(72) Inventors: Martin Patrick McEnroe, Plano, TX (US); Eric Zavesky, Austin, TX (US); Joshua Whitney, Richardson, TX (US); Rhonda Green, Garland, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/393,200

(22) Filed: Aug. 3, 2021

(65) Prior Publication Data

US 2021/0383009 A1    Dec. 9, 2021

Related U.S. Application Data

(63) Continuation of application No. 16/407,427, filed on May 9, 2019, now Pat. No. 11,106,812.

(51) Int. Cl.
*H04L 9/40* (2022.01)
*G06F 21/62* (2013.01)
(Continued)

(52) U.S. Cl.
CPC ........ *G06F 21/6218* (2013.01); *H04L 9/3247* (2013.01); *H04L 63/126* (2013.01); *G06F 2221/2101* (2013.01); *H04L 9/50* (2022.05)

(58) Field of Classification Search
CPC ......... G06F 21/6218; G06F 2221/2101; H04L 9/3247; H04L 63/126; H04L 9/50
See application file for complete search history.

(56) References Cited

U.S. PATENT DOCUMENTS 9,515,948 B2 * 12/2016 Lowry ..................... G06F 7/00
10,068,397 B2    9/2018 Day et al.
(Continued)

FOREIGN PATENT DOCUMENTS

CN        108390762 A    8/2018
EP          3376455 A1    9/2018
(Continued)

OTHER PUBLICATIONS

Kreder III, et al., "BlockReduce: Scaling Blockchain to Human Commerce", Chief Security Officer, GridPlus Inc., Oct. 31, 2018, 9pgs.
(Continued)

*Primary Examiner* — Ghodrat Jamshidi
(74) *Attorney, Agent, or Firm* — Guntin & Gust, PLC; Jay Anderson

(57) ABSTRACT

In a dataset exchange environment in which datasets are available for exchange or transformation, a dataset validation platform may be configured to update a cryptographically signed record based on each dataset that is available via the data exchange environment. The dataset validation platform may be further configured to control access to the datasets based on whether a request to access a particular dataset is compliant with an availability requirement of the particular dataset. The dataset validation platform may be further configured to update the cryptographically signed record based on requests to access the datasets, transformations that are based on the datasets, or modifications to the availability requirement of the datasets, such as a modification to a privacy limitation or other availability requirement indicating a criteria for usage of the requested dataset.

20 Claims, 7 Drawing Sheets

(51) Int. Cl.
*H04L 9/32* (2006.01)
*H04L 9/00* (2022.01)

(56) References Cited

U.S. PATENT DOCUMENTS

| | | |
|---|---|---|
| 10,097,356 B2 | 10/2018 | Zinder |
| 10,135,607 B1 | 11/2018 | Roets |
| 10,248,316 B1* | 4/2019 | van Rotterdam ....... G06F 3/067 |
| 10,535,062 B1 | 1/2020 | Rule et al. |
| 2008/0172737 A1* | 7/2008 | Shen ................. G16H 10/60 |
| | | 726/21 |
| 2014/0046291 A1* | 2/2014 | Harris ............... A61M 5/16836 |
| | | 604/503 |
| 2014/0067702 A1* | 3/2014 | Rathod .................. G06Q 50/01 |
| | | 705/319 |
| 2017/0063883 A1* | 3/2017 | Franzoni Martinez ...................... |
| | | H04L 63/102 |
| 2017/0272250 A1 | 9/2017 | Kaliski, Jr. |
| 2018/0165612 A1 | 6/2018 | Saxena et al. |
| 2018/0183687 A1 | 6/2018 | Dementev et al. |
| 2018/0189312 A1 | 7/2018 | Alas et al. |
| 2018/0189449 A1 | 7/2018 | Karumba et al. |
| 2018/0189509 A1 | 7/2018 | Goldsteen et al. |
| 2018/0293547 A1 | 10/2018 | Randhawa |
| 2018/0349621 A1 | 12/2018 | Schvey et al. |
| 2019/0007402 A1 | 1/2019 | Andrade |
| 2019/0238316 A1 | 8/2019 | Padmanabhan |
| 2019/0238525 A1 | 8/2019 | Padmanabhan et al. |
| 2019/0286828 A1 | 9/2019 | Anderson et al. |
| 2020/0242081 A1* | 7/2020 | Lee ........................ G06F 16/164 |
| 2020/0279232 A1* | 9/2020 | Xu ..................... G06Q 20/3827 |
| 2020/0356689 A1 | 11/2020 | Mcenroe et al. |

FOREIGN PATENT DOCUMENTS

| | | |
|---|---|---|
| EP | 3404891 A1 | 11/2018 |
| WO | 2017168159 A1 | 10/2017 |
| WO | 2018059334 A1 | 4/2018 |
| WO | 2018076761 A1 | 5/2018 |
| WO | 2018124297 A1 | 7/2018 |
| WO | 2018167253 A1 | 9/2018 |
| WO | 2018177110 A1 | 10/2018 |
| WO | 2018186874 A1 | 10/2018 |
| WO | 2018201009 A1 | 11/2018 |
| WO | 2018211290 A1 | 11/2018 |
| WO | 2018213333 A1 | 11/2018 |
| WO | 2019005104 A1 | 1/2019 |
| WO | 2019010459 A1 | 1/2019 |
| WO | 2019014399 A1 | 1/2019 |

OTHER PUBLICATIONS

Weber, et al., "Untrusted Business Process Monitoring and Execution Using Blockchain", School of Computer Science and Engineering, UNSW, Australia, Sep. 1, 2016, 16 pgs.

* cited by examiner

CONTROLLING ACCESS TO DATASETS DESCRIBED IN A CRYPTOGRAPHICALLY SIGNED RECORD

CROSS-REFERENCE TO RELATED APPLICATIONS

This application is a continuation of U.S. application Ser. No. 16/407,427, filed May 9, 2019, which is incorporated herein by reference in its entirety.

TECHNICAL FIELD

This disclosure relates generally to the field of data access control, and more specifically relates to controlling access to datasets based on compliance standards that are described in a cryptographically signed record.

BACKGROUND

In a computing environment, data may be generated or collected by a data management system. The data management system may maintain one or more sets of electronic data, such as datasets stored in a database or other electronic storage systems. The data management system may be operated by, for example, an organization, such as a company, a government agency, a university, or any other organization that maintains datasets. In some cases, the data management system may maintain a dataset according to a standard of compliance, such as a compliance standard indicating how data in the dataset is protected or used.

The data management system may receive a request to share some or all of the maintained datasets. The request may be received from an additional data management system, for the purpose of transforming data from multiple datasets. The additional data management system may maintain data according to an additional compliance standard. However, the additional compliance standard may not include protections similar to the standard used by the data management system. In addition, the transformation requested by the additional data management system may inadvertently violate one or both of the compliance standards, such as by exposing a combination of data that would otherwise be protected in the untransformed datasets.

It is desirable to establish techniques to control access to a dataset based on a compliance standard applied to the dataset. In addition, it is desirable to generate a reliable record of requested data transformations, to allow data transformations to be monitored.

SUMMARY

According to certain implementations, a dataset validation platform may receive first metadata for a first dataset. The first metadata may indicate identification data for a source of the first dataset and an availability requirement indicating criteria for use of the first dataset. The dataset validation platform may receive, from a requesting system, a request to access the first dataset. The request may indicate second metadata for a second dataset, additional identification data for the requesting system, and a requested transformation that is based on the first and second datasets. The dataset validation platform may receive a compliance verification that indicates that the requested transformation in compliant with the availability requirement of the first dataset. Responsive to receiving the compliance verification, the dataset validation platform may generate a first data block and a second data block. The first data block may include the first metadata. The second data block may include a combination of the second metadata, the additional identification data, and the compliance verification. The dataset validation platform may modify a cryptographically signed record to include the first data block and the second data block. In addition, the dataset validation platform may provide to the requesting system access to the first dataset.

These illustrative implementations are mentioned not to limit or define the dataset validation platform disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
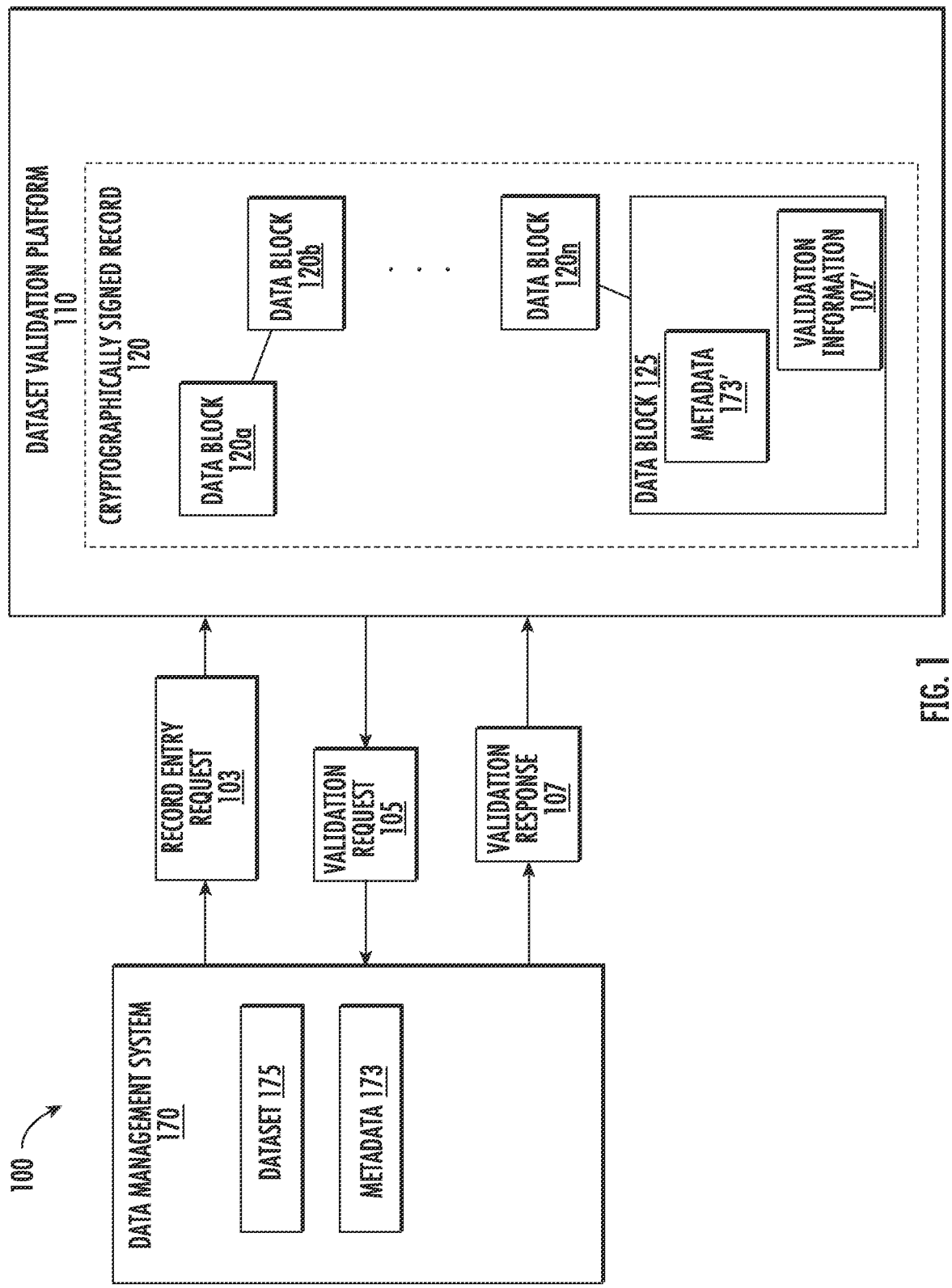
FIG. 1 is a block diagram depicting an example of a dataset exchange environment in which datasets may be exchanged or transformed.

Prior techniques for exchanging or sharing datasets do not provide techniques to control access to a dataset based on a compliance standard for the dataset. In addition, prior techniques for exchanging datasets do not provide a record of compliance standards for a dataset or requests to access the dataset. Certain implementations described herein may provide for a dataset validation platform that is configured to control access to datasets based on information described in a cryptographically signed record. In addition, the dataset validation platform may be configured to modify the cryptographically signed record based on information describing a dataset, such as a compliance standard or a source of the dataset. The dataset validation platform may further be configured to modify the cryptographically signed record based on information describing requests to access the dataset or transformations (either requested or completed) that are based on the dataset.

In a non-limiting example, an organization that provides a dataset, such as a research hospital, may have one or more compliance standards for their dataset, such as a compliance standard to protect patient information. The example research hospital may use the dataset validation platform to describe the dataset and the compliance standard, such as a description in a cryptographically signed record. The example research hospital may also use the dataset validation platform to confirm that other organizations requesting access to the dataset meet the compliance standard for the dataset. In addition, an organization that requires a dataset, such as a university that is seeking medical research data, may use the dataset validation platform to search for a dataset that is suitable for a use intended by the organization, such as a dataset that could be used to provide research data. In this example, the dataset validation platform may receive from the university an access request for the hospital's dataset. The dataset validation platform may perform a compliance verification to determine if the intended usage described in the access request is compliant with the compliance standards of the hospital. Based on the compliance verification, the dataset validation platform may allow (or deny) access to the dataset. In addition, the dataset validation platform may update a cryptographically signed record to indicate one or more of the access request received from the university, a result of the compliance verification, or whether the university was allowed to access the dataset.

The following examples are provided to introduce certain implementations of the present disclosure. A dataset validation platform may be included in a dataset exchange environment, in which one or more participant computing systems are configured to provide or request datasets. The dataset validation platform may be configured to maintain a cryptographically signed record that describes datasets that are available in the exchange environment. The cryptographically signed record may describe respective compliance standards for the available datasets, such as by describing availability requirements for the respective datasets. In addition, the cryptographically signed record may describe the data included in the respective datasets such as data types or protections applied to the data (e.g., anonymization, encryption). The cryptographically signed record may include validation data for the available datasets, such as validation data that verifies an identity of a source system (e.g., a source that provides an available dataset).

A compliance standard, such as a compliance standard that is associated with a dataset or described in a cryptographically signed record, may include one or more availability requirements. In some cases, an availability requirement describes a condition or limitation on how an associated dataset may be used. For instance, the availability requirement may describe one or more criteria for authorized use of the dataset, such as criteria that are set by a source of the dataset. Examples of availability requirements may include a requirement to maintain a level of privacy for the dataset or to maintain a level of security for the dataset. Additional examples of availability requirements may include technical requirements (e.g., applying a certain type of encryption, using a particular application or software environment to process the dataset), usage requirements (e.g., a time limit, specifying non-commercial use only, specifying use in a geographical region), contractual requirements (e.g., payment or data exchange terms, terms of a license, terms of a contract), or any other suitable type of requirement for using a dataset. In some cases, an availability requirement may include a combination of requirements, such as a multi-level availability requirement that permits decryption of particular portions of data within a particular application or software platform.

In some implementations, the dataset validation platform receives a request to access a first available dataset, such as from a requesting system that is a participant in the dataset exchange environment. The request may indicate a transformation based on the first dataset, such as a requested transformation that modifies, removes, or adds data in the first dataset. The request may also indicate a second dataset on which the requested transformation is based, such as a combination of the first and second datasets. Based on information from the cryptographically signed record describing the first dataset and from the access request describing the second dataset, compliance verification may be performed to determine whether the requested transformation is compliant with availability requirements for one or more of the first or second datasets. If the compliance verification indicates that the requested transformation is compliant, the dataset validation platform may provide access to the first dataset for the requesting system. In addition, the dataset validation platform may update the cryptographically signed record based on the access request. The updated cryptographically signed record may describe one or more of the requesting system, the requested (or completed) transformation based on the first and second datasets, or the compliance verification.

In some implementations, the dataset validation platform may modify access to the first dataset. For example, the dataset validation platform may receive a request indicating a modification to the compliance standard for the first dataset. In addition, the dataset validation platform may receive a compliance alert indicating that the requested (or completed) transformation based on the first and second datasets could be non-compliant with availability requirements for one or more of the first or second datasets. Based on the request or compliance alert (or both), the dataset validation platform may modify access of the requesting system to the first dataset, such as by revoking the requesting system's access. In addition, the dataset validation platform may update the cryptographically signed record based on the modified access. The updated cryptographically signed record may describe one or more of the modification to the compliance standard, the compliance alert, or the modification of the requesting system's access to the first dataset.

Referring now to the drawings, FIG. 1 is a diagram depicting an example implementation of a computing environment, such as a dataset exchange environment 100, in which datasets may be exchanged or transformed. The dataset exchange environment 100 may include a data validation platform 110, and one or more data management systems, such as the data management system 170. In some cases, the dataset validation platform 110 and the data management system 170 may be configured to communicate, for example, via one or more networks.

In some implementations, the data management system 170 includes one or more datasets, such as a dataset 175. The dataset 175 may include data that is generated, collected, or otherwise managed by the data management system 170. In addition, the data management system 170 may also include metadata associated with the one or more datasets maintained by the data management system 170, such as metadata 173 that is associated with the dataset 175. The metadata 173 describes information about the dataset 175. For example (and not by way of limitation), the metadata 173 may describe one or more data fields, data protections, availability requirements, or any other suitable information about the dataset 175. Data fields may indicate a label for a particular field of the data (e.g., a database field that is labeled "First Name"), a category of data (e.g., medical information, browsing history), or any other suitable descriptions of data included in a dataset. A data protection may indicate a type of protection that is applied to some or all data in a dataset, such as encryption, anonymization, hashing, or any other suitable protection technique. An availability requirement may indicate a criteria for authorized use of data in a dataset, such as a standard of computing security, a privacy limitation, a license, a geographical region, a usage category (e.g., research use, not-for-profit), a legal or governmental jurisdiction, or any other suitable criteria for authorized use.

In the dataset exchange environment 100, the metadata 173 may indicate a compliance standard for the dataset 175 that includes one or more availability requirements. Based on the compliance standard, the metadata 173 may indicate that the dataset 175 is authorized for access by a requesting system that fulfills all of the availability requirements in the compliance standard. In some implementations, the dataset validation platform 110 may be configured to control access to datasets maintained by the data management system 170 based on an availability requirement for a respective dataset, such as controlling access to the dataset 175 based on an availability requirement indicated by the metadata 173.

The dataset validation platform 110 may include one or more cryptographically signed records, such as a cryptographically signed record 120. The cryptographically signed record 120 may include one or more data blocks, such as data block 120a through data block 120n. In some implementations, the cryptographically signed record 120 may be configured such that each data block describes one or more preceding data blocks, such as a blockchain configuration. For example, data block 120b may include a hash (or other data structure) that describes the preceding data block 120a. In addition, data block 120n may include a hash that describes the multiple preceding data blocks 120a, 120b, and additional preceding data blocks that are included in the cryptographically signed record 120.

In some implementations, the cryptographically signed record 120 may describe one or more datasets, or transformations of datasets, that are accessible via the dataset validation platform 110. In addition, the cryptographically signed record 120 may describe one or more availability requirements of the described datasets or transformations of datasets. For example, each of the data blocks 120a through 120n may be associated with a respective dataset. The data blocks 120a through 120n may each include metadata for the respective dataset, such as metadata that describes at least one field in the respective dataset, at least one availability requirement of the respective dataset. In some cases, one or more of data blocks 120a through 120n may indicate a transformation (requested or completed) of the respective dataset, such as a transformation that removes, adds, or modifies a portion of data from the dataset; modifies a protection (e.g., modified encryption, anonymizing an additional portion of the dataset); combines two or more datasets; or any other suitable data transformation of the respective dataset. In addition, one or more of data blocks 120a through 120n may indicate a modified availability requirement of the respective dataset. Non-limiting examples of modified availability requirements include changing a privacy limitation, changing a license term, adding a usage category, indicating that the respective dataset is not available, or any other suitable modification.

The dataset validation platform 110 may receive a request to record an additional entry in the cryptographically signed record 120, such as a request from a data management system to record a dataset, record a transformation of a dataset, or record a modified availability requirement. For example, the dataset validation platform 110 may receive from the data management system 170 a record entry request 103. The record entry request 103 may include a request to record, in the cryptographically signed record 120, an entry describing the dataset 175 that is maintained by the data management system 170. In addition, the record entry request 103 may include (or otherwise indicate) the metadata 173, describing at least one data field and at least one availability requirement of the dataset 175. In some cases, the record entry request 103 may include data identifying the source of the dataset 175, such as identification data for the data management system 170.

In response to receiving a request to record an additional entry the dataset validation platform 110 may verify a source of the dataset described in the request. For example, based on the record entry request 103, the dataset validation platform 110 may verify the source of the dataset 175. In some cases, the dataset validation platform 110 may verify the source of the dataset 175 based on the identification data included in the record entry request 103. For example, the dataset validation platform 110 may provide to the data management system 170 a validation request 105. The validation request 105 may include information related to verifying the source of the dataset 175. For example, the validation request 105 may include a request to verify the identity of the data management system 170, such as a request for a security certificate, an authentication challenge, or any other suitable technique to verify a computing system identity. In addition, the validation request 105 may include a request to verify an origin of the dataset 175, such as a request for a chain of title or license by which the dataset 175 was received, a request for information about generation of the data, or any other suitable information to establish the origin of a dataset. The dataset validation platform 110 may receive a validation response 107 from the data management system 170. The validation response 107 may include information that verifies the source of the dataset 175, such as a response that verifies the identity of the data management system 170 or the origin of the dataset 175. Although FIG. 1 depicts the validation request 105 and the validation response 107 as being provided to and received from the data management system 170, other implementations are possible. For example, the dataset validation platform 110 may provide the validation request 105, or one or more additional validation requests, to one or more additional computing systems, such as a computing system that provides identity authentication services, or a computing system associated with a licensor or previous owner of the dataset 175. In addition, a software module included in the dataset validation platform 110, such as an authentication module, may receive the validation request 105 and provide the validation response 107.

Based on the validation response 107, the dataset validation platform 110 may generate a data block 125 that is associated with the dataset 175. The data block 125 may include (or otherwise indicate) at least a portion of the metadata 173, such as metadata 173'. The metadata 173' may describe at least one data field and at least one availability requirement of the dataset 175. In addition, the data block 125 may include at least a portion of the validation response 107, such as validation information 107'. The validation information 107' may describe the verification of the source of dataset 175, such as data from the validation response 107 or data describing an exchange of the validation request 105 and the validation response 107. In addition, the data block 125 may include one or more of an encrypted representation of at least one previous data block (such as a hash of the data block 120n), an encrypted representation of the structure of the cryptographically signed record 120 (such as a Merkle tree of the cryptographically signed record 120), or any other suitable representation of the cryptographically signed record 120. In some cases, the data block 125 may omit the dataset 175 itself, such by describing the dataset 175 (e.g., metadata 173' describing fields) and omitting any of the data included within the dataset 175.

In some implementations, the dataset validation platform 110 may modify the cryptographically signed record 120 to include the data block 125. For example, the dataset validation platform 110 may update the cryptographically signed record 120 to append the data block 125 from the data block 120n (or to another previous data block) based on a blockchain technique. In some cases, the dataset validation platform 110 is configured to allow additional computing systems, such as one or more data management systems, to access the cryptographically signed record 120 for inspection. Inspection of the cryptographically signed record 120, including the modified cryptographically signed record 120, may provide to the additional computing systems information describing available datasets, such as the dataset 175. A computing system that inspects the cryptographically signed record 120 may determine one or more available datasets, availability requirements under which the available datasets may be accessed, and validation information for the available datasets. For example, inspecting data block 125 may indicate a field included in the dataset 175, an availability requirement indicating a criteria for use of the dataset 175, and verification of the source of dataset 175. In some cases, the cryptographically signed record 120 may be configured for inspection by one or more computing systems that participate in a data exchange, such as a data management system that may request access to the dataset 175. In addition, the cryptographically signed record 120 may be configured for inspection by any computing system, such as a public inspection by a computing system configured to audit a source of a dataset. In some cases, providing the cryptographically signed record 120 for inspection (e.g., inspection by a participant, public inspection) may increase a trustworthiness of datasets that are described by the cryptographically signed record 120, such as by providing a record of a dataset's contents, its source, and any transformations that are applied (or requested to be applied) to the dataset. In addition, the cryptographically signed record 120 may be unalterable (e.g., each included data block is cryptographically signed based on a preceding data block), which may further improve the trustworthiness of the record of the dataset's contents, source, and applied transformations.

Figure 2:
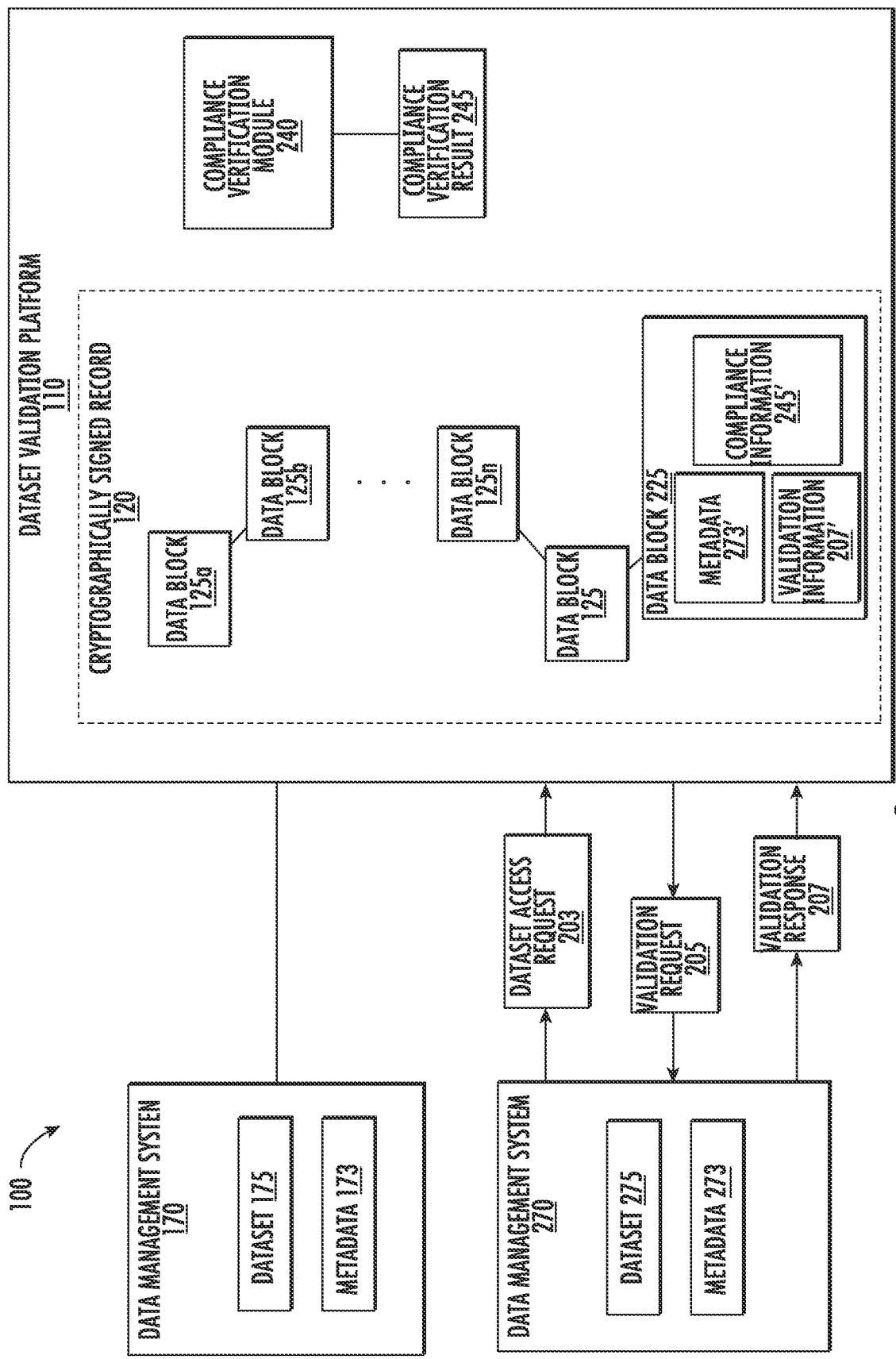
FIG. 2 is a diagram depicting an example of a dataset exchange environment in which a dataset validation platform is configured to modify a cryptographically signed record based on a request to access a dataset.

In some implementations, a dataset validation platform may be configured to modify a cryptographically signed record based on requests to exchange or transform a dataset. The dataset validation platform may append to the cryptographically signed record an additional data block that describes, for instance, an identity of a requesting computing system, a requested dataset, an intended use for the requested dataset (e.g., exchange, transformation, combination), and compliance information describing whether the intended use fulfills the availability requirements that are associated with the requested dataset. The appended data block may be unalterable once appended to the cryptographically signed record (e.g., the cryptographically signed record may have subsequent blocks appended, but previous blocks are not modified). FIG. 2 depicts an example implementation of the dataset exchange environment 100 in which the dataset validation platform 110 is configured to modify the cryptographically signed record 120 based on a request to access a dataset, such as the dataset 175. For example, the dataset validation platform 110 may generate an additional data block that indicates a request to access the dataset 175, an identity of the requesting system, and compliance information indicating if the request adheres to a compliance standard associated with the dataset 175.

In FIG. 2, the dataset exchange environment 100 may include one or more additional data management systems, such as the data management system 270. The data management system 270 includes one or more datasets, such as a dataset 275 that includes data generated, collected, or otherwise managed by the data management system 270. In addition, the data management system 270 may also include metadata 273 that is associated with the dataset 275. The metadata 273 describes information about the dataset 275, such as one or more data fields, data protections, availability requirements, or any other suitable information about the dataset 275. In addition, the metadata 273 may indicate a compliance standard for the dataset 275 that includes one or more of the availability requirements.

The cryptographically signed record 120 may be accessible by one or more data management systems, such as the data management system 170 and the data management system 270. The data management system 270 may access the cryptographically signed record 120 for the purpose of requesting access to a dataset that is described by one or more of the data blocks included in the cryptographically signed record 120. For example, the data management system 270 may inspect the data block 125, such as by inspecting information included in the metadata 173' or the validation information 107' (or both). Based on the data block 125, the data management system 270 may determine that the dataset 275 may be transformed based on the dataset 175 (e.g., fields described by the metadata 173' may be used in a transformation of dataset 275). In addition, the data management system 270 may determine that the dataset 175 adheres to the compliance standard for the dataset 275 (e.g., the validation information 107' or availability requirements in metadata 173' indicate that dataset 175 adheres to the compliance standard). In some cases, providing the cryptographically signed record 120 for inspection increases a trustworthiness of datasets that are described by the cryptographically signed record 120, such as by allowing a computing system to determine if an available dataset adheres to a compliance standard.

The dataset validation platform 110 may receive a request to access a dataset that is described by the cryptographically signed record 120. For example, the dataset validation platform 110 may receive from the data management system 270 a dataset access request 203. The dataset access request 203 may include a request to access the dataset 175 described by the data block 125. In addition, the dataset access request 203 may describe an intended usage of the requested dataset. For example, the dataset access request 203 may describe intended requested transformation of the dataset 175, such as a combination of dataset 175 with the dataset 275. The dataset access request 203 may include the metadata 273, describing at least one data field and at least one availability requirement of the dataset 275. In some cases, the request 203 may include data identifying the source of the dataset 275, such as identification data for the data management system 270.

In response to receiving a request to access a dataset described by the cryptographically signed record 120, the dataset validation platform 110 may verify the identity of the requesting computing system. For example, based on the dataset access request 203, the dataset validation platform 110 may validate the identification data of the data management system 270. Validating the identification of the data management system 270 may include requesting a security certificate, providing an authentication challenge, or performing any other suitable technique to verify a computing system identity. In addition, the dataset validation platform 110 may verify the source of the dataset 275. Verifying the source of the dataset 275 may include determining an origin of the dataset 275, determining information about generation of the data, or any other suitable technique to establish the origin of a dataset. In some cases, the source of the dataset 275 is verified based on information included in the cryptographically signed record 120, or information in the data access request 203, or both. For example, the data access request 203 may be compared to a membership contract that is recorded in the cryptographically signed record 120, such as a membership contract associated with the data management system 270. The membership contract may indicate membership in a decentralized autonomous organization that maintains (or is otherwise associated with) the cryptographically signed record 120. Based on the comparison, the dataset validation platform 110 may generate (or receive) a validation response that validates the dataset 275, or verifies the identity of the data management system 270, or both.

In some cases, the dataset validation platform 110 may provide to the data management system 270 a validation request 205. The validation request 205 may include information related to validating the identity of the data management system 270, or to verifying the source of the dataset 275, or both. The dataset validation platform 110 may receive a validation response 207 from the data management system 270. The validation response 207 may include information that validates the identity of the data management system 270, such as a response to an authentication challenge, a security certificate, or any other suitable validation technique. Although FIG. 2 depicts the validation request 205 and the validation response 207 as being provided to and received from the data management system 270, other implementations are possible. For example, the dataset validation platform 110 may provide the validation request 205 (or one or more additional validation requests) to one or more additional computing systems, such as a computing system that provides identity authentication services, or to an authentication software module included in the dataset validation platform 110.

In some implementations, a validation response (e.g., generated by the data validation platform 110, received from the data management system 270, received from an identity authentication system) may indicate that the source of the dataset 275 is not verified, such as by indicating a failed identity validation. The dataset validation platform 110 may generate a data block indicting an outcome of the verification attempt, such as the failed identity verification, and may modify the cryptographically signed record 120 to include the data block. In addition, responsive to the failed identity verification, the dataset validation platform 110 may prevent the data management system 270 from accessing the dataset 175.

In some implementations, the dataset validation platform 110 may determine whether the intended usage described by an access request fulfills a compliance standard associated with the requested dataset, including one or more availability requirements for the requested dataset. In some cases, the dataset validation platform 110 may also determine whether the intended usage fulfills one or more compliance standards associated with other datasets included in the intended usage. For example, the dataset validation platform 110 may perform, or request, a compliance verification to determine whether the intended usage described by the dataset access request 203 fulfills one or more availability requirements associated with the requested dataset 175. In addition, the compliance verification may also determine whether the described intended usage fulfills one or more availability requirements associated with the dataset 275. The compliance verification may include operations related to detecting a violation of the availability requirements, such as determining if the intended usage violates a security standard or data protection technique required for the dataset(s) 175 or 275, determining if a license is required for the dataset(s) 175 or 275, determining if the data management system(s) 170 or 270 are associated with a required geographical region, or any other availability requirement associated with one or more of the datasets 175 and 275.

In some cases, a compliance verification module 240 included in the dataset validation platform 110 may perform the compliance verification based on information included in one or both of the data block 125 and the dataset access request 203. Based on the metadata 173', for example, the compliance verification module 240 may determine at least one availability requirement associated with the dataset 175. In addition, based on the dataset access request 203, the compliance verification module 240 may determine an intended usage for the dataset 175, such as a combination of the dataset 175 and the dataset 275. In some cases, the compliance verification module 240 may determine at least one additional availability requirement associated with the dataset 275, based on the metadata 273 included in the dataset access request 203.

The compliance verification module 240 may determine whether the intended combination of the datasets 175 and 275 fulfills the availability requirement of the dataset 175. If the dataset 275 has an additional availability requirement, the compliance verification module 240 may determine whether the intended combination fulfills the additional availability requirement of the dataset 275. In some cases, the compliance verification module 240 may determine whether the intended combination violates a security standard or data protection technique indicated by the availability requirement(s).

For example, the compliance verification module 240 may determine that a combination of protected data and unprotected data from the datasets 175 and 275 could violate a security standard or data protection for at least one of the datasets. At least one of the datasets may include a data field that is protected, such as a data field labeled "Last Name" in the dataset 175 that is protected via an encryption technique. In addition, the compliance verification module 240 may determine a similar data field that is unprotected in another one of the datasets, such as a data field labeled "Name" in the dataset 275 that is not encrypted. Based on the protected data field and the similar unprotected data field, the compliance verification module 240 may determine that the intended combination of the datasets 175 and 275 could violate the data protection indicated for dataset 175 (e.g., anonymized names in the dataset 175 could be revealed in the intended combination).

In some cases, the compliance verification module 240 may determine that a combination of unprotected data from the datasets 175 and 275 could violate the security standard indicated for the dataset(s). For example, the dataset 175 could include unprotected data that is associated with a non-personal identifier, such as medical information that is associated with a non-personal identifier including a zip code. The dataset 275 may include additional unprotected data that is associated with a personal identifier, such as a person's name and zip code. The compliance verification module 240 may determine that the intended combination of the datasets 175 and 275 could violate the data protection indicated for, at least, the dataset 175 (e.g., non-personal medical data in the dataset 175 could be associated with a personal identifier in the dataset 275). As an additional example, the datasets 175 and 275 may each include a sparse sample set of, for instance, location data, such as instantaneous locations associated with a personal mobile device. A sparse set of data may be insufficient to determine a personal identity, such as sparse location data that is scattered over irregular periods of time. In a non-combined state, the sparse sets may each be compliant with the security standard indicated for the dataset(s). The compliance verification module 240 may determine that the intended combination of the datasets 175 and 275 could provide a dense sample set, such as a location data set that provides sufficient locations to determine a personal identity. For example, dense location data could identify a location for a personal mobile device at frequent time intervals (e.g., daily at 5:00 PM). The compliance verification module 240 may determine that the intended combination of the datasets 175 and 275 violates one or more data protections indicated for, at least, the dataset 175 (e.g., identifying an individual based on a daily or weekly routine). Examples described herein are non-limiting, and additional techniques to determine a violation of a security standard or data protection technique are possible.

In some implementations, the dataset validation platform 110 may receive a compliance verification result 245, such as from the compliance verification module 240. The compliance verification result 245 may indicate whether or not the intended usage fulfills a compliance standard or availability requirement(s) associated with the requested dataset (or another dataset included in the intended usage). In some cases, the compliance verification result 245 may indicate a violation (or potential violation) of a security standard or data protection technique indicated by the availability requirement(s). Although FIG. 2 depicts the compliance verification as being performed via the compliance verification module 240 included in the dataset validation platform 110, other implementations are possible. For example, the dataset validation platform 110 may provide a compliance verification request to one or more additional computing systems, such as a compliance verification system that determines whether an intended usage of dataset fulfills a compliance standard for the dataset. The compliance verification system may provide a response to the dataset validation platform 110 that includes a compliance verification result.

Based on one or more of the dataset access request 203 or the compliance verification result 245, the dataset validation platform 110 may generate at least one data block, such as a data block 225. The data block 225 may be associated with the requested dataset 175. In some cases, the data block 225 may also be associated with an additional dataset indicated by the intended usage in the dataset access request 203, such as dataset 275. The data block 225 may include (or otherwise indicate) some or all data from the compliance verification result 245, such as compliance information 245'. The compliance information 245' may indicate one or more of the intended usage as described by the access request 203; one or more datasets included in the intended usages, such as the requested dataset 175 or the dataset 275; or an indication of whether the intended usage fulfills (or violates) associated availability requirements. In some cases, the compliance information 245' may indicate whether the requesting data management system 270 was allowed to access the dataset 175, based on whether the availability requirements for dataset 175 were fulfilled. In addition, the data block 225 may include at least a portion of metadata for the dataset indicated by the intended usage, such as metadata 273' that is based on the metadata 273. The data block 225 may also include information identifying the requesting computing system, such as validation information 207'. The validation information 207' may include at least a portion of the validation response 207. In some cases, the data block 225 may include information related to the requested dataset, such as metadata 173' or validation information 107'. In addition, the data block 225 may include one or more of an encrypted representation of at least one previous data block (such as a hash of the data block 125), an encrypted representation of the structure of the cryptographically signed record 120, or any other suitable representation of the cryptographically signed record 120. In some cases, the data block 225 may omit the datasets 175 and 275, such by describing the datasets 175 and 275 (e.g., metadata 273' describing fields) and omitting the included data. FIG. 2 depicts the data block 225 as including the metadata 273', validation information 207', and compliance information 245', but other implementations are possible, such as including each of the metadata 273', validation information 207', and compliance information 245' in a respective generated data block. In some cases, the dataset validation platform 110 may generate an additional data block indicating whether the data management system 280 is allowed to access to the dataset 175.

In some implementations, the dataset validation platform 110 may modify the cryptographically signed record 120 to include the data block 225 (or any additional data blocks). For example, the dataset validation platform 110 may update the cryptographically signed record 120 to append the data block 225 from the data block 125 (or to another previous data block) based on a blockchain technique. The dataset validation platform 110 may be configured to allow additional computing systems to access the cryptographically signed record 120 for inspection, including inspection of the appended data block 225. Inspection of the modified cryptographically signed record 120 may provide to the additional computing systems information describing intended usages of available datasets, such as transformations, combinations, or other dataset uses. A computing system that inspects the cryptographically signed record 120 may determine an identity of a requesting computing system, which datasets were requested and the intended use of the requested dataset, and whether or not the intended use fulfilled availability requirements or a compliance standard for the requested dataset. In some cases, providing the cryptographically signed record 120 for inspection may increase a trustworthiness of requests to access datasets that are described by the cryptographically signed record 120, such as by providing a record of requesting systems, intended uses of the requested datasets, and whether the intended uses fulfill compliance standards for the requested datasets. In some implementations, the cryptographically signed record 120 may improve trustworthiness of a determination for whether an access request is fulfilled, such as by including in the record a homomorphically encrypted result (or partial result) of a performed transformation. In addition, the cryptographically signed record 120 may be unalterable (e.g., each included data block is cryptographically signed based on a preceding data block), which may further improve the trustworthiness of the record of requests.

Figure 3:
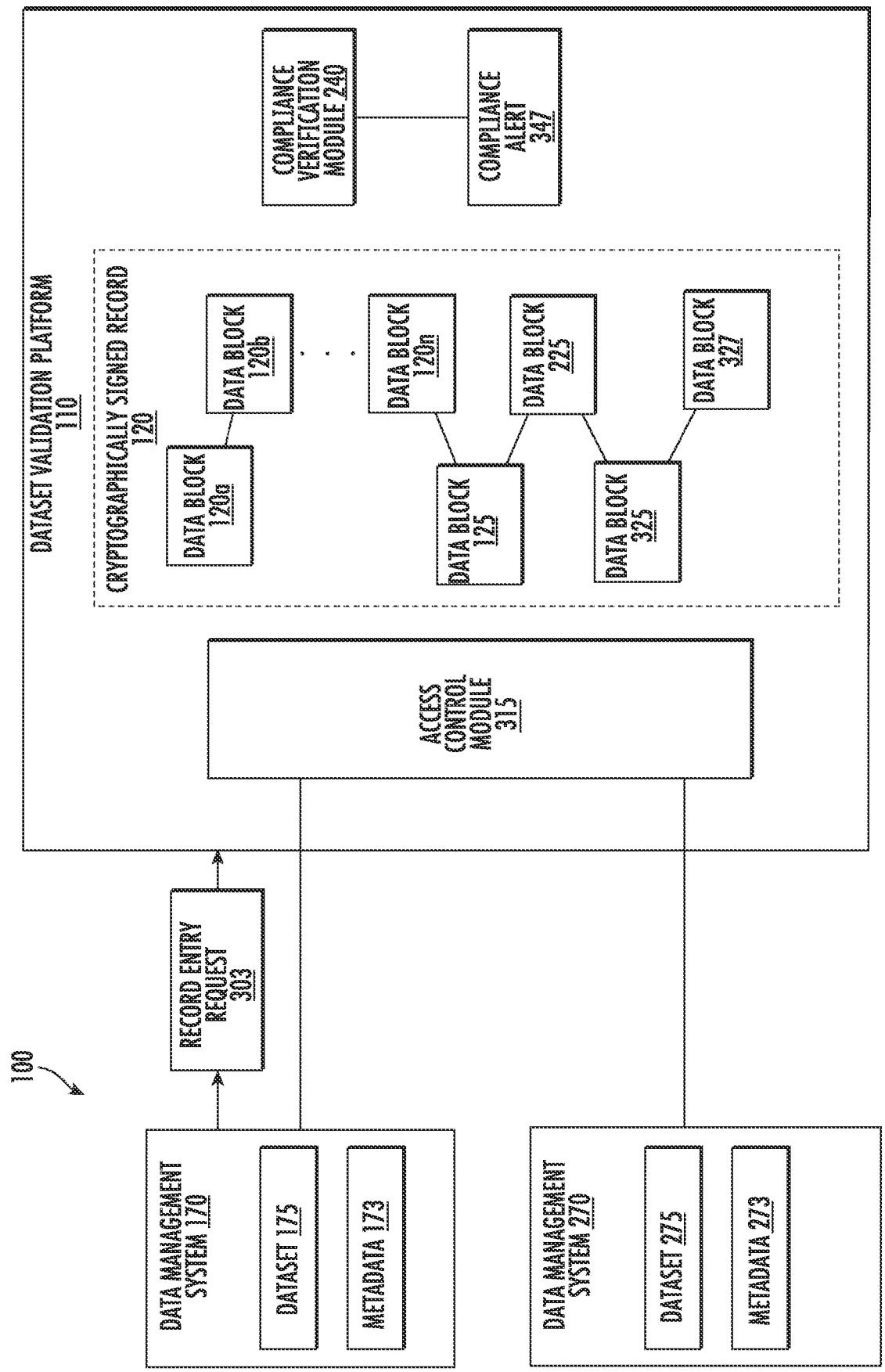
FIG. 3 is a diagram depicting an example of a dataset exchange environment in which dataset access is controlled based on availability requirements.

In some implementations, a dataset validation platform may be configured to control access to a dataset based on availability requirements associated with the dataset. The dataset validation platform may allow or deny access to the dataset based on, for instance, whether a requesting computing system such as a data management system fulfills the availability requirements that are associated with the dataset. FIG. 3 depicts an example implementation of the dataset exchange environment 100 in which access to a particular dataset is controlled based on availability requirements associated with the particular dataset. In FIG. 3, the dataset exchange environment 100 may include the dataset validation platform 110 and the data management systems 170 and 270. The dataset validation platform 110 may receive a request from the data management system 270 to access dataset 175, such as the dataset access request 203 (as described in regards to FIG. 2). In addition, the dataset validation platform 110 may perform (or request) a compliance verification regarding the access request, and may receive a compliance verification result, such as the compliance verification result 245. The dataset validation platform may modify the cryptographically signed record 120 to include a data block describing the access request, such as the data block 225.

In some implementations, the dataset validation platform 110 may be configured to control access to the dataset 175 based on whether an access request, such as the dataset access request 203, fulfills one or more availability requirements associated with the dataset 175, such as availability requirements indicated by metadata 173 or data block 125. In some implementations, an access control module 315 included in the dataset validation platform 110 may be configured to allow or prevent a requesting computing system access to a dataset indicated in the cryptographically signed record 120, based on one or more availability requirements associated with the requested dataset. For example, the access control module 315 may receive the compliance verification result 245. Based on the compliance verification result 245, the access control module 315 may determine whether the dataset access request 203 fulfills the availability requirements for the dataset 175, for the dataset 275, or for both. The access control module 315 may be configured to allow the data management system 270 access to the dataset 175, responsive to the compliance verification result 245 indicating that the access request 203 fulfills the availability requirements. In addition, the access control module 315 may be configured to prevent the data management system 270 from accessing the dataset 175, responsive to the compliance verification result 245 indicating that the access request 203 violates at least one availability requirement for the dataset 175 (or for the dataset 275).

The access control module 315 may be configured to control access via any suitable technique. For example, the access control module 315 may provide to one or more of the data management systems 170 or 270 compliance information (such as, without limitation, the compliance information 245') indicating that the access request 203 is compliant with the availability requirements. In addition, the access control module 315 may provide to one or more of the data management systems 170 or 270 authentication information identifying data management system 270 as the requestor and/or data management system 170 as the provider of dataset 175, such as an authentication token, a security certificate, or other suitable identification information. In some cases, the access control module 315 may provide a communication channel via which the data management system 270 may access the dataset 175, such as a secured communication channel that provides a respective access point for each of the data management systems 170 and 270. In addition, the dataset validation platform 110 may perform a requested transformation, or provide a request to another computing system (e.g., data management system 170) to perform a requested transformation, and provide to the data management system 270 a transformation result, such as an encrypted result. Other techniques to control access to the dataset 175 may be recognized by those skilled in the art.

In some implementations, access to a dataset may be controlled based on information included in a cryptographically signed record. The dataset validation platform 110 may use information in the cryptographically signed record 120 to determine whether an intended transformation described in an access request has been performed, or whether an additional transformation (e.g., not described in an access request) has been performed. For example, the dataset validation platform 110 may receive from the data management system 270 a transformation result (or partial result). The dataset validation platform 110 may determine, based on analysis of the result, that the performed transformation matches the requested transformation. In some cases, the result may be encrypted, such as via a homomorphic encrypted technique. The cryptographically signed record 120 may be modified to include a data block indicating the result, or encrypted result. In some cases, including a result or encrypted result in a cryptographically signed record may improve trustworthiness of access requests described by the record, such as by providing a proof that an access request is fulfilled.

In addition, the dataset validation platform 110 may perform the requested transformation (or provide a request to another computing system to perform the transformation). In addition, the dataset validation platform 110 may provide to the requesting system (e.g., data management system 270) a transformation result. The transformation result may be encrypted, such as via a homomorphic encryption technique. In some cases, the requesting system may be able to access the transformation result, but unable to access the inputs to the transformation (e.g., dataset 175), and thus be unable to perform additional transformations without providing additional requests. The cryptographically signed record 120 may be modified to include a data block indicating the transformation performed by the dataset validation platform 110. In some cases, indicating the performed transformation in a cryptographically signed record may improve trustworthiness of access requests described by the record, such as by indicating that the requested transformation was performed without additional (e.g., non-requested) transformations.

In some cases, it may be suitable to revoke access to a dataset indicated in a cryptographically signed record. For example, a dataset transformation that had previously fulfilled the availability requirements of the dataset may become noncompliant. In some cases, a compliance standard for the dataset may be modified, such as by adding, removing, or modifying an availability requirement in the compliance standard. The cryptographically signed record may be modified to include a data block indicating one or more of the access revocation or the modified compliance standard.

In some implementations, the dataset validation platform 110 may be configured to modify access to a dataset. For example, the data management system 170 may update the metadata 173 to indicate one or more modified availability requirements for the dataset 175. In some cases, the dataset validation platform 110 may receive from the data management system 170 an additional record entry request, such as a record entry request 303, indicating the modifications to the metadata 173. The modifications may include updating, adding, or removing a privacy limitation, a license term, a usage category, or other suitable availability requirements. In addition, the dataset validation platform 110 may perform one or more of verifying the source of the dataset 175 (e.g., based on the additional record entry request 303), generating a data block 325 indicating the modifications, or modifying the cryptographically signed record 120 to append the data block 325 to a previous block (such as, without limitation, data block 225). The data block 325 may include information describing the modified metadata 173, validation information based on the additional record entry request 303, an encrypted representation of at least one previous data block in the cryptographically signed record 120, or other suitable information.

Based on the record entry request 303, the compliance verification module 240 may perform an additional compliance verification. For example, the compliance verification module 240 may determine one or more access requests associated with the dataset 175, based on the record entry request 303 indicating the dataset 175. In addition, the compliance verification module 240 may perform an additional compliance verification for the access requests, such as an additional compliance verification for the dataset access request 203 based on the modifications indicated by data block 325. Based on the additional compliance verification, the compliance verification module 240 may determine that the dataset access request 203 does not fulfill one or more modified availability requirements for the dataset 175.

In some cases, the compliance verification module 240 may generate a compliance alert 347 indicating that the dataset access request 203 no longer fulfills the compliance standard for the dataset 175 (e.g., based on the modified availability requirements). Responsive to receiving the compliance alert 347, the dataset validation platform 110 may modify access to the dataset 175. For example, the access control module 315 may be configured to prevent the data management system 270 from accessing the dataset 175 based on the compliance alert 347, such as by expiring an authentication token, revoking a security certificate, eliminating a communication channel, or any other suitable technique to control access to the dataset 175. FIG. 3 depicts an implementation in which the compliance alert 347 is provided by the compliance verification module 240, but other implementations are possible. For example, the dataset validation platform 110 may receive a compliance alert from one or more of the data management system 170, the data management system 270, or an additional computing system (such as a computing system configured to audit compliance standards indicated by the cryptographically signed record 120).

In some implementations, the dataset validation platform 110 may generate an additional data block 327, based on the modified access to the dataset 175. The data block 327 may include (or otherwise indicate) some or all data from the compliance alert 347. In addition, the data block 327 may indicate one or more of the intended usage as described by the access request 203, or one or more datasets included in the intended usages, such as the requested dataset 175 or the dataset 275. In some cases, the data block 327 may include information describing the access modification, such as by indicating a technique by which access was revoked or a timestamp for the time when access was revoked. The data block 327 may also include an encrypted representation of at least one previous data block in the cryptographically signed record 120. The dataset validation platform 110 may modify the cryptographically signed record 120 to include the data block 327, such as by appending the data block 327 to the data block 325 (or to another previous data block).

Figure 4:
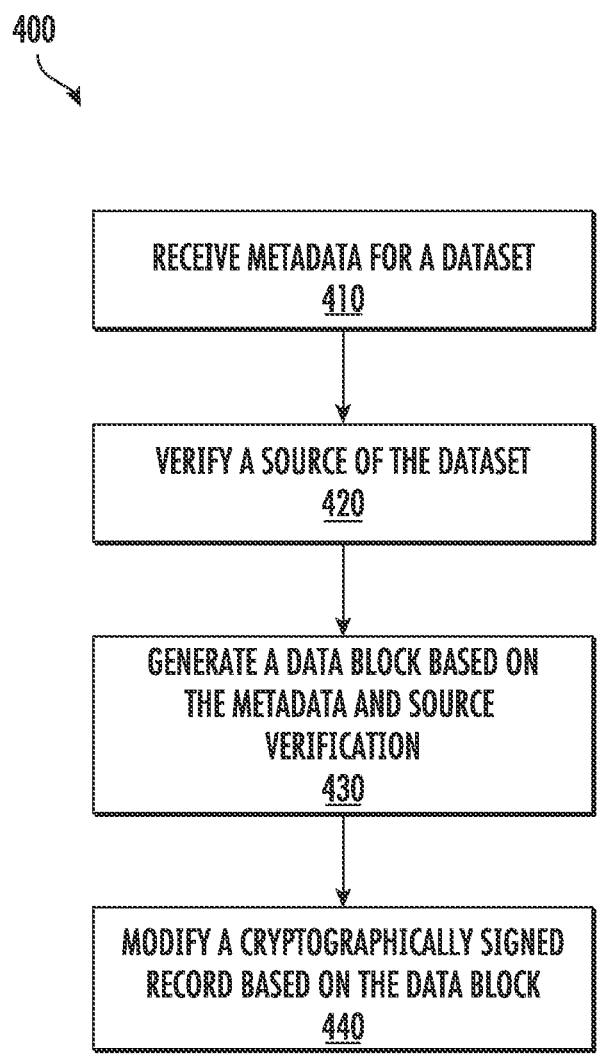
FIG. 4 is a flow chart depicting an example of a process for modifying a cryptographically signed record of dataset availability.
Figure 5:
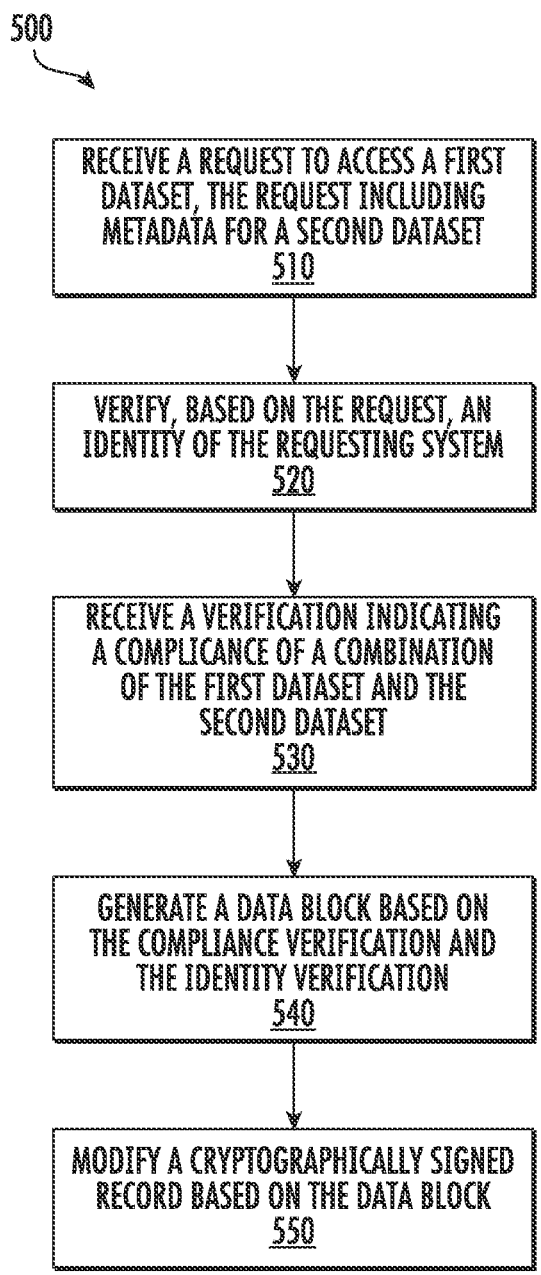
FIG. 5 is a flow chart depicting an example of a process for modifying a cryptographically signed record based on a request to access a dataset.
Figure 6:
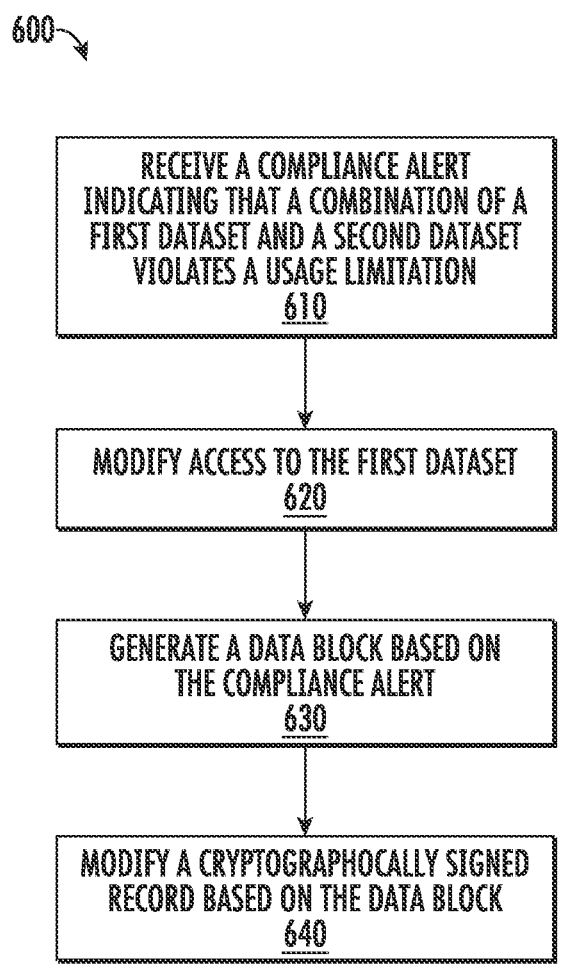
FIG. 6 is a flow chart depicting an example of a process for modifying a cryptographically signed record based on a modified access to a dataset.

In a computing environment in which datasets are available for exchange or transformation, such as a dataset exchange environment, a dataset validation platform may be configured to update a cryptographically signed record based on each dataset that is available via the data exchange environment. The dataset validation platform may be further configured to update the cryptographically signed record based on requests to access the datasets, transformations (requested or completed) that are based on the datasets, or modifications to the availability of the datasets (e.g., changes to an availability requirement, revoking availability of a dataset or one of its transformations). FIGS. 4-6 describe example operations that may be executed by a dataset validation platform that is configured to update a cryptographically signed record.

FIG. 4 is a flowchart depicting an example of a process 400 for modifying a cryptographically signed record of dataset availability. In some implementations, such as described in regards to FIGS. 1-3, a computing device executing a dataset validation platform implements operations described in FIG. 4, by executing suitable program code. For illustrative purposes, the process 400 is described with reference to the examples depicted in FIGS. 1-3. Other implementations, however, are possible.

At block 410, the process 400 involves receiving metadata for a dataset. The metadata may include identification data for the source of the dataset. In addition, the metadata may include an availability requirement for the first dataset. The availability requirement maybe included in a compliance standard for the dataset, or may indicate one or more criteria for authorized use of data in the dataset. In some cases, the metadata may describe one or more fields that are included in the dataset. For example, a data validation platform, such as the dataset validation platform 110, may receive metadata about a dataset from a data management system, such as the data management system 170. The dataset validation platform 110 may receive the metadata 173 describing one or more of an availability requirement for the dataset 175, or a field in the dataset 175, or identification data for the data management system 170.

At block 420, the process 400 involves verifying a source of the received dataset. In some cases, verifying the source of the dataset includes validating identification data of the source. For example, the dataset validation platform 110 may validate identification data for the data management system 170, responsive to receiving the metadata 173. Verifying the source of the received dataset may include operations related to one or more of an authentication challenge, requesting a security certificate, or any other suitable technique to verify an identity of a computing system from which the metadata was received. In some cases, the validation data is generated based on the verification of the source.

At block 430, the process 400 involves generating a data block based on one or more of the metadata and the source verification. The data block may include some or all of the metadata. In addition, the data block may include data describing the verifying the source, such as validation data generated in regards to block 420. For example, the dataset validation platform 110 may generate the data block 125 including a combination of the metadata 173' and the validation information 107'.

At block 440, the process 400 involves modifying a cryptographically signed record based on the data block. Modification of the cryptographically signed record may include appending the data block to one or more additional data blocks that are included in the cryptographically signed record. For example, the dataset validation platform 110 may modify the cryptographically signed record 120 to include the data block 125, such as by appending the data block 125 to the data block 120*n*.

FIG. 5 is a flow chart addicting an example of a process 500 for modifying a cryptographically signed record based on a request to access a dataset. In some implementations, such as described in regards to FIGS. 1-4, a computing device executing a dataset validation platform implements operations described in FIG. 5, by executing suitable program code. For illustrative purposes, the process 500 is described with reference to the examples depicted in FIGS. 1-4. Other implementations, however, are possible.

At block 510, the process 500 involves receiving a request to access a first dataset. The request may indicate an intended usage of the first dataset based on a second dataset, such as a requested transformation based on one or both of the first or second datasets. In some cases, the request may include metadata for the second dataset, identification data associated with a requesting computing system, or both. For example, the dataset validation platform 110 may receive from the data management system 270 a request to access the dataset 175 for a requested transformation of the dataset 175, such as a combination of the dataset 175 with the dataset 275.

At block 520, the process 500 involves verifying an identity of the computing system from which the request to access the first dataset is received. In some cases, the identity of the requesting system is verified based on the received request, such as by validating the identification data received with the access request. For example, the dataset validation platform 110 may verify an identity of the data management system 270 based on identification information included in the access request 203.

At block 530, the process 500 involves receiving a compliance verification. The compliance verification may indicate whether the intended usage of the first dataset (e.g., indicated by the access request) is compliant with an availability requirement of the first dataset. For example, the compliance verification module 240 may compare an availability requirement associated with the dataset 175 to an intended usage indicated by the access request 203. In addition, the compliance verification module 240 may determine whether a combination of the datasets 175 and 275 fulfills a respective availability requirement of one or more of the datasets 175 and 275.

At block 540, the process 500 involves generating a data block based on one or more of the compliance verification and the identity verification. The data block may include data describing the identity verification, such as data describing validation of the identification data. In addition, the data block may include the compliance verification. For example, the dataset validation platform 110 may generate the data block 225 including a combination of the metadata 273' and the compliance information 245'.

At block 550, the process 500 involves modifying a cryptographically signed record based on the data block. Modification of the cryptographically signed record may include appending the data block to one or more additional data blocks that are included in the cryptographically signed record. For example, the dataset validation platform 110 may modify the cryptographically graphically signed record 120 to include the data block 225, such as by appending the data block 225 to the data block 125.

In some implementations, operations described in regards to FIG. 5 may be implemented in combination with one or more additional operations. For example, a dataset validation platform that is configured to perform operations described in regards to FIG. 5 may perform one or more additional operations, such as described in regards to FIG. 4.

FIG. 6 is a flow chart depicting an example of a process 600 for modifying a cryptographically signed record based on a modified access to a dataset. In some implementations, such as described in regards to FIGS. 1-5, a computing device executing a dataset validation platform implements operations described in FIG. 6, by executing suitable program code. For illustrative purposes, the process 600 is described with reference to the examples depicted in FIGS. 1-5. Other implementations, however, are possible.

At block 610, the process 600 involves receiving a compliance alert, such as a compliance alert indicating a transformation based on a first dataset and a second dataset. The compliance alert may indicate that the transformation, such as a combination of the first dataset and the second dataset, violates at least one availability requirement of the first dataset or the second dataset (or both). For example, the dataset validation platform 110 may receive the compliance alert 347, indicating that a transformation (requested or completed) of the dataset 175 (e.g., indicated by the dataset access request 203) violates an availability requirement in the compliance standard for the dataset 175. In some cases, the compliance alert may indicate an update of one or more availability requirements of the first or second datasets. In addition, the compliance alert may indicate that the transformation violates a privacy limitation from the availability requirements of the first or second datasets. For example, the privacy limitation may indicate a level of privacy (e.g., a level of encryption, anonymization of one or more data fields) required by combinations including the first dataset. In some implementations, the compliance alert may be received from a compliance module, such as the compliance verification module 240. In addition, the compliance alert may be received from a computing system associated with the first or second datasets, such as one or the data management systems 170 or 270, or from an additional computing system, such as a system that is configured to audit cryptographically signed records related to dataset availability.

At block 620, the process 600 involves modifying access to the first dataset, such as an access modification that is responsive to receiving the compliance alert. Modifying access to the first dataset may include preventing a computing system, such as a data management system, from accessing the first dataset. For example, the dataset validation platform 110 may be configured to modify access of the data management system 270 to the dataset 175, such as by revoking access, via the access control module 315, to the dataset 175. Based on the modified access, the data management system may be unable to access the first dataset. In some cases, the data management system may be unable to perform the transformation based on the first dataset and second dataset, subsequent to the access modification.

At block 630, the process 600 involves generating a data block based on the compliance alert. The data block may include information associated with the compliance alert, such as data indicating the violated availability requirement, a modification to an availability requirement, or other information related to the alert. In addition, the data block may include information describing the access modification or one or more computing systems having modified access. In some implementations, an additional data block is generated based on a portion of the information associated with the compliance alert. For example, the data block 327 generated by the dataset validation platform 110 may describe one or more of information from the compliance alert 347 or a modification of the data management system 270 to the dataset 175. In addition, the data block 325 generated by the dataset validation platform 110 may describe a modified availability requirement of the dataset 175.

At block 640, the process 600 involves modifying a cryptographically signed record based on the data block. Modification of the cryptographically signed record may include appending the data block to one or more additional data blocks that are included in the cryptographically signed record. For example, the dataset validation platform 110 may modify the cryptographically graphically signed record 120 to include one or more of the data blocks 327 or 325, such as by appending the data block 327 or the data block 325 to another data block in the cryptographically signed record 120.

In some implementations, operations described in regards to FIG. 6 may be implemented in combination with one or more additional operations. For example, a dataset validation platform that is configured to perform operations described in regards to FIG. 6 may perform one or more additional operations, such as described in regards to FIGS. 4 and 5.

Figure 7:
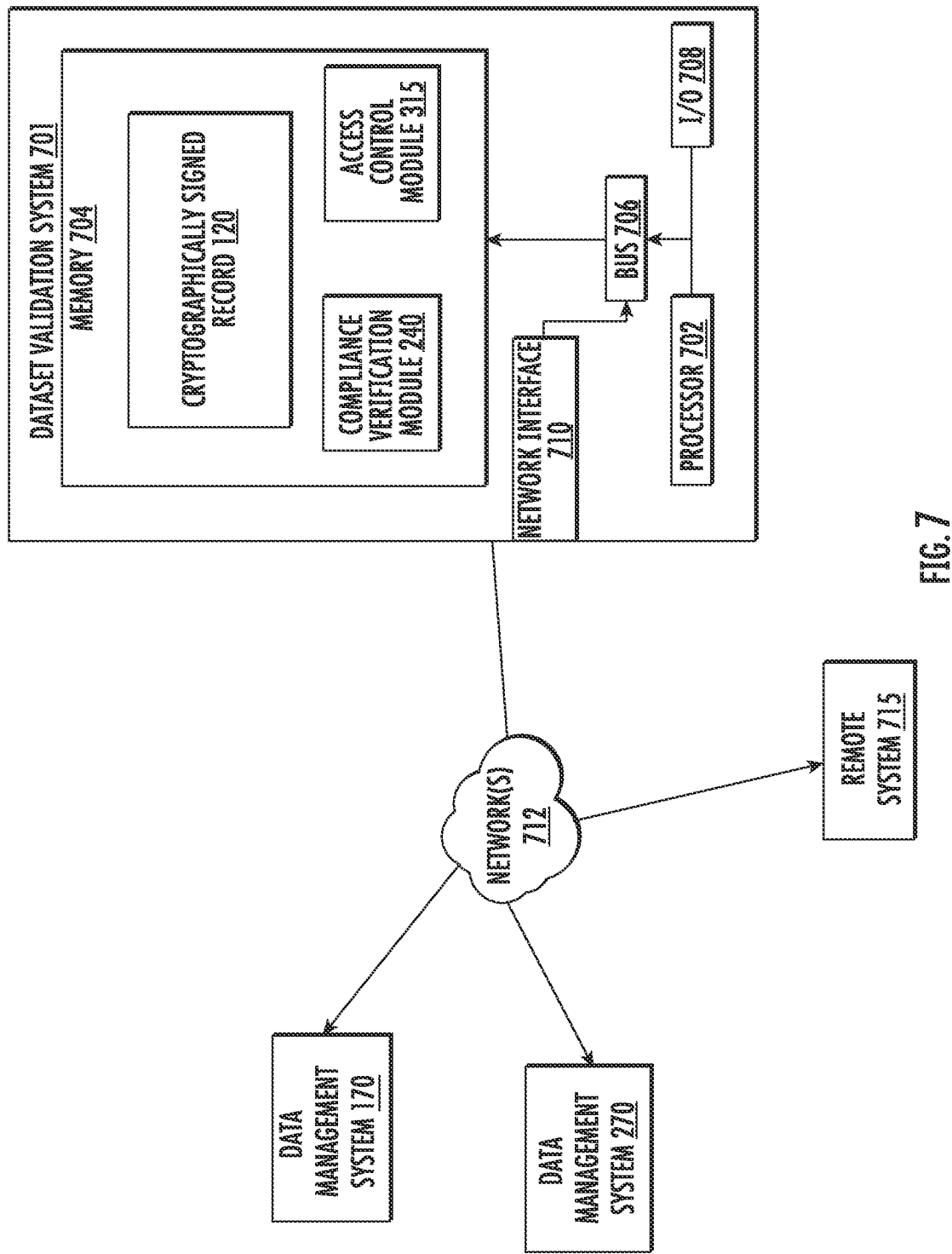
FIG. 7 is a block diagram depicting an example of a computing system for controlling access to datasets based on information in a cryptographically signed record, according to certain implementations.

Any suitable computing system or group of computing systems can be used for performing the operations described herein. For example, FIG. 7 is a block diagram depicting a dataset validation system 701 that is configured to perform operations related to validating datasets (or transformations of datasets) that are available in a dataset exchange environment, controlling access to the datasets based on information in a cryptographically signed record, and modifying the cryptographically signed record based on the datasets, according to certain implementations.

The depicted example of the dataset validation system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the cryptographically signed record 120, the compliance verification module 240, the access control module 315, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The dataset validation system 701 may also include a number of external or internal devices such as input or output devices. For example, the dataset validation system 701 is shown with an input/output ("I/O") interface 708 that can receive input from input devices or provide output to output devices. A bus 706 can also be included in the dataset validation system 701. The bus 706 can communicatively couple one or more components of the dataset validation system 701.

The dataset validation system 701 executes program code that configures the processor 702 to perform one or more of the operations described above with respect to FIGS. 1-6. The program code includes operations related to, for example, one or more of the cryptographically signed record 120, the compliance verification module 240, the access control module 315, or other suitable applications or memory structures that perform one or more operations described herein. The program code may be resident in the memory device 704 or any suitable computer-readable medium and may be executed by the processor 702 or any other suitable processor. In some implementations, the program code described above, the cryptographically signed record 120, the compliance verification module 240, and the access control module 315 are stored in the memory device 704, as depicted in FIG. 7. In additional or alternative implementations, one or more of the cryptographically signed record 120, the compliance verification module 240, the access control module 315, and the program code described above are stored in one or more memory devices accessible via a data network, such as a memory device accessible in another dataset validation system in the dataset exchange environment 100, via a cloud service, or via any other suitable memory access technique.

The dataset validation system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. A remote system 715 is connected to the dataset validation system 701 via network 712, and remote system 715 can perform some of the operations described herein, such as storing color images or extracted patches. The dataset validation system 701 is able to communicate with one or more of the remote computing system 715 and the data management systems 170 and 270 using the network interface 710. In some implementations, the remote system 715 is configured to perform operations described in regards to FIGS. 1-6, such as operations to audit the cryptographically signed record 120, or to provide a compliance alert, or both.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A device comprising:
   a processing system including a processor; and
   a memory that stores executable instructions that, when executed by the processing system, facilitate performance of operations comprising:
   receiving first metadata regarding a first dataset, the first metadata indicating identification data for a source of the first dataset and a criterion for use of the first dataset;
   receiving, from a requesting system, a request to access the first dataset, the request indicating identification data for the requesting system, second metadata of a second dataset, and a requested transformation based on the first dataset and the second dataset;
   receiving a compliance verification indicating that the requested transformation is compliant with the criterion;
   responsive to the receiving the compliance verification, generating a first data block including the first metadata and a second data block including a combination of the identification data for the requesting system, the second metadata, and the compliance verification;
   modifying a cryptographically signed record to include the first data block and the second data block; and
   providing, to the requesting system, access to the first dataset.

2. The device of claim 1, wherein the processing system is configured to control access to datasets in a dataset exchange environment.

3. The device of claim 2, wherein the processing system comprises a dataset validation platform to control access to the first dataset.

4. The device of claim 1, wherein the first metadata indicates an availability requirement of the first dataset, wherein the availability requirement indicates one or more criteria for use of the first dataset.

5. The device of claim 4, wherein the operations further comprise:
   receiving a compliance alert indicating that the transformation based on the first dataset and the second dataset violates a privacy limitation of the availability requirement of the first dataset, wherein the privacy limitation indicates a level of privacy required by transformations based on, at least, the first dataset.

6. The device of claim 5, wherein the operations further comprise:
   modifying access of the requesting system to the first dataset;
   responsive to the receiving the compliance alert, generating a third data block including the compliance alert; and
   modifying the cryptographically signed record to include the third data block.

7. The device of claim 1, wherein the operations further comprise:
   verifying the source of the first dataset, wherein the verifying the source includes validating the identification data of the source; and
   verifying the requesting system, wherein the verifying the requesting system includes validating the identification data of the requesting system.

8. The device of claim 1, wherein the modifying the cryptographically signed record includes appending the first data block and the second data block to at least one additional data block in the cryptographically signed record via a blockchain technique.

9. The device of claim 1, wherein the first metadata indicates a protected field included in the first dataset and the second metadata indicates an unprotected field included in the second dataset, wherein the protected field complies with a security standard and the unprotected field does not comply with the security standard,
   wherein the compliance verification is based on a comparison of the protected field to the unprotected field.

10. The device of claim 1, wherein the providing access to the first dataset further comprises providing to the requesting system an authentication token, a security certificate, an access point for a secured communication channel, or a combination thereof.

11. A method comprising:
   receiving, by a processing system including a processor, first metadata regarding a first dataset, the first metadata indicating identification data for a source of the first dataset and a criterion for use of the first dataset;
   receiving, by the processing system from a requesting system, a request to access the first dataset, the request indicating identification data for the requesting system, second metadata of a second dataset, and a requested transformation based on the first dataset and the second dataset;
verifying, by the processing system, the requesting system, wherein the verifying the requesting system includes validating the identification data of the requesting system;
receiving, by the processing system, a compliance verification indicating that the requested transformation is compliant with the criterion;
generating, by the processing system responsive to the receiving the compliance verification, a first data block including the first metadata and a second data block including a combination of the identification data for the requesting system, the second metadata, and the compliance verification;
modifying, by the processing system, a cryptographically signed record to include the first data block and the second data block; and
providing, by the processing system to the requesting system, access to the first dataset.

12. The method of claim 11, wherein the processing system is configured to control access to datasets in a dataset exchange environment.

13. The method of claim 12, wherein the processing system comprises a dataset validation platform to control access to the first dataset.

14. The method of claim 11, wherein the first metadata indicates an availability requirement of the first dataset, wherein the availability requirement indicates one or more criteria for use of the first dataset.

15. The method of claim 14, further comprising:
receiving, by the processing system, a compliance alert indicating that the transformation based on the first dataset and the second dataset violates a privacy limitation of the availability requirement of the first dataset, wherein the privacy limitation indicates a level of privacy required by transformations based on, at least, the first dataset.

16. The method of claim 11, wherein the first metadata indicates a protected field included in the first dataset and the second metadata indicates an unprotected field included in the second dataset, wherein the protected field complies with a security standard and the unprotected field does not comply with the security standard,
wherein the compliance verification is based on a comparison of the protected field to the unprotected field.

17. A non-transitory machine-readable medium comprising executable instructions that, when executed by a processing system including a processor, facilitate performance of operations comprising:
receiving first metadata regarding a first dataset, the first metadata indicating identification data for a source of the first dataset and a criterion for use of the first dataset, wherein the first metadata indicates an availability requirement of the first dataset;
receiving, from a requesting system, a request to access the first dataset, the request indicating identification data for the requesting system, second metadata of a second dataset, and a requested transformation based on the first dataset and the second dataset;
receiving a compliance verification indicating that the requested transformation is compliant with the criterion;
responsive to the receiving the compliance verification, generating a first data block including the first metadata and a second data block including a combination of the identification data for the requesting system, the second metadata, and the compliance verification;
modifying a cryptographically signed record to include the first data block and the second data block; and
providing, to the requesting system, access to the first dataset.

18. The non-transitory machine-readable medium of claim 17, wherein the processing system is configured to control access to datasets in a dataset exchange environment.

19. The non-transitory machine-readable medium of claim 18, wherein the processing system comprises a dataset validation platform to control access to the first dataset.

20. The non-transitory machine-readable medium of claim 17, wherein the operations further comprise:
receiving a compliance alert indicating that the transformation based on the first dataset and the second dataset violates a privacy limitation of the availability requirement of the first dataset, wherein the privacy limitation indicates a level of privacy required by transformations based on, at least, the first dataset;
modifying access of the requesting system to the first dataset;
responsive to the receiving the compliance alert, generating a third data block including the compliance alert; and
modifying the cryptographically signed record to include the third data block.

* * * * *